US008078230B2

(12) United States Patent
Schuler et al.

(10) Patent No.: US 8,078,230 B2
(45) Date of Patent: Dec. 13, 2011

(54) METHOD AND APPARATUS FOR PROVIDING A PRIORITIZED LIST OF DISPLAY DEVICES FOR DISPLAY OF A MEDIA FILE

(75) Inventors: Francesca Schuler, Des Plaines, IL (US); Julius S. Gyorfi, Vernon Hills, IL (US); Swee M. Mok, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 835 days.

(21) Appl. No.: 12/147,958

(22) Filed: Jun. 27, 2008

(65) Prior Publication Data

US 2009/0325642 A1 Dec. 31, 2009

(51) Int. Cl.
*H04B 1/16* (2006.01)
*H04N 5/445* (2006.01)

(52) U.S. Cl. .............. 455/566; 725/44; 725/51; 725/80; 455/41.2

(58) Field of Classification Search .......... 455/41.2, 455/41.3, 566; 725/37, 38, 39, 44, 51, 74, 725/80, 81
See application file for complete search history.

(56) References Cited

U.S. PATENT DOCUMENTS

| 7,624,210 | B2 * | 11/2009 | Izutsu .............................. 710/62 |
| 2005/0177853 | A1 * | 8/2005 | Williams et al. ................. 725/81 |
| 2006/0094360 | A1 * | 5/2006 | Jung et al. .................... 455/41.2 |
| 2006/0248557 | A1 * | 11/2006 | Stark et al. ...................... 725/37 |

FOREIGN PATENT DOCUMENTS

| WO | 2005/079018 A1 | 8/2005 |
| WO | 2006/075223 A1 | 7/2006 |

OTHER PUBLICATIONS

U.S. Appl. No. 11/970,981, filed Jan. 8, 2008.

* cited by examiner

*Primary Examiner* — Blane J Jackson

(57) ABSTRACT

A method and apparatus are disclosed for providing a prioritized list of display devices for display of a media file, the prioritized list being provided on a mobile computing device, the display devices being connected to the mobile computing device in a network. The method may include determining characteristics of the media file, discovering by the mobile computing device the display devices connected to the mobile computing device, discovering by the mobile computing device display characteristics of the display devices, creating the prioritized list of display devices by comparing the characteristics of the media file to the display characteristics of the display devices, and providing the prioritized list of the display devices on the mobile computing device for selection by a user.

17 Claims, 6 Drawing Sheets

METHOD AND APPARATUS FOR PROVIDING A PRIORITIZED LIST OF DISPLAY DEVICES FOR DISPLAY OF A MEDIA FILE

BACKGROUND OF THE INVENTION

1. Field of the Invention

The invention relates to mobile computing devices, and in particular, to providing a prioritized list of display devices for display of a media file.

2. Introduction

Mobile computing devices, such as cellular phones, handheld computers, MP3 players, laptop computers, are very pervasive computing devices. The mobile computing devices provide various features, such as communications, computing features, Internet access, playing music or video, image viewing, etc. Such mobile computing devices will often include a display, such as an LCD (liquid crystal display).

The display can be used to view content such as photos, movies, websites, and the like. The content to be viewed may typically be stored in a memory of the mobile device or on a remote device such as a server. The mobile device may be connected to other devices, also containing a display, over a network, such as a Wi-Fi network. For example, the mobile device may be connected to a home television, a home computer, a projector, a laptop computer, or the like, and the user may be able to display content from the mobile device on one of these other devices.

However, it may be difficult for a user to determine which of these other devices it would be most desirable to display the content on. For example, where the content has a very high resolution, it may be desirable to display the content on one of the devices having a correspondingly high resolution display. When the content to be displayed has a relatively long duration, and one or more of the devices is operating on battery power that may be consumed by displaying the content for its duration, it may be more desirable to display the content on another device.

SUMMARY OF THE INVENTION

A method and apparatus are disclosed for providing a prioritized list of display devices for display of a media file, the prioritized list being provided on a mobile computing device, the display devices being connected to the mobile computing device in a network. The method may include determining characteristics of the media file, discovering by the mobile computing device the display devices connected to the mobile computing device, discovering by the mobile computing device display characteristics of the display devices, creating the prioritized list of display devices by comparing the characteristics of the media file to the display characteristics of the display devices, and providing the prioritized list of the display devices on the mobile computing device for selection by a user.

BRIEF DESCRIPTION OF THE DRAWINGS

In order to describe the manner in which advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows and in part will be obvious from the description or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without departing from the spirit and scope of the invention.

Figure 1:
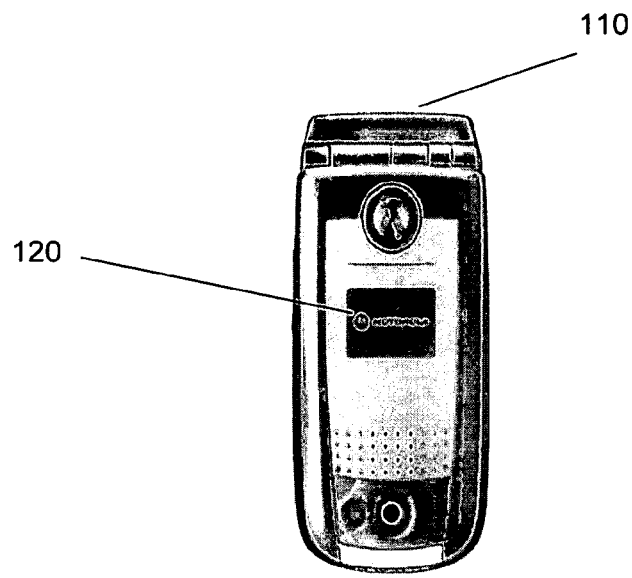
FIG. 1 is an exemplary diagram of a mobile computing device in accordance with embodiments of the invention.

FIG. 1 is an exemplary diagram of a mobile computing device 110 in accordance with a possible embodiment of the invention. The mobile computing device 110 may be any mobile or portable computing device, including a mobile telephone, cellular telephone, a wireless radio, a portable computer, a laptop, an MP3 player, satellite radio, satellite television, etc. The mobile computing device 110 may have a display 120, which may be an LCD display, for example. The display may be a touch screen display allowing the user to access various control functions through a user interface, for example. Alternatively, the mobile computing device may have other input/output devices, such as a keyboard, voice-control device, scrolling devices, etc.

Figure 2:
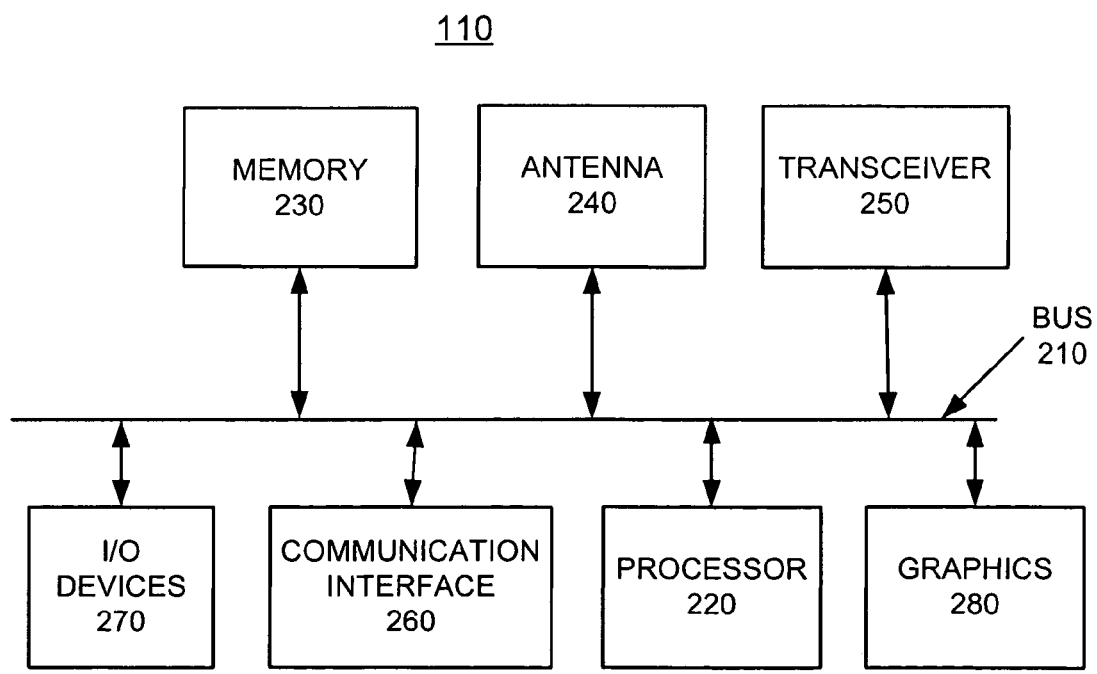
FIG. 2 is a block diagram of an exemplary mobile computing device in accordance with embodiments of the invention.

FIG. 2 is a block diagram of an exemplary mobile computing device 110 in accordance with a possible embodiment of the invention. The exemplary mobile computing device 110 may include a bus 210, a processor 220, and a memory 230. The bus 210 may permit communication among the components of the mobile computing device 110. The mobile computing device 110 may include other optional elements such as an antenna 240, a transceiver 250, a communication interface 260, input/output (I/O) devices 270, and a graphics device 280, although these elements may not be necessary to practice the invention.

Processor 220 may include at least one conventional processor or microprocessor that interprets and executes instructions. Memory 230 may be a random access memory (RAM) or another type of dynamic storage device that stores information and instructions for execution by processor 220.

Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communication station and may be defined by hardware or software in any manner known to one of skill in the art. The processor 220 is cooperatively operable with the transceiver 250 to support operations within the network.

Input/output devices (I/O devices) may include one or more conventional input mechanisms that permit a user to input information to the mobile communication device 110, such as a microphone, touchpad, keypad, keyboard, mouse, pen, stylus, voice recognition device, buttons, etc. Output devices 270 may include one or more conventional mechanisms that output information to the user, including a display, one or more speakers, etc. The display may typically be an LCD display as used on many conventional mobile computing devices.

Additionally, the mobile computing device 110 may include or have associated with it a second display, either LCD or non-LCD type, functioning as an output device 270. This second display may be built into the device in addition to an LCD display, or may be added to the mobile computing device prior to or after purchase of the mobile computing device 110 by the consumer.

The mobile computing device 110 may perform functions in response to processor 220 by executing sequences of instructions or instruction sets contained in a computer-readable medium, such as, for example, memory 230. Such instructions may be read into memory 230 from another computer-readable medium, such as a storage device, or from a separate device via a communication interface. The programming necessary to accomplish the functionality of the invention may be stored in the memory 230 of the mobile computing device 110 at the time of manufacture, or may be loaded into the memory 230 at a later time.

During use, the user may initiate the display of a media file, such as a video clip, a still photo, a document, or a web page, among others. The media file may be any type of visual content including still images, such as photos, video clips or video streams, documents, etc. These may include specific media types such as but not limited to JPEG, BMP, GIF, MP4, WMV, MOV, PDF, DOC, XLS, PPT, etc. The media file may be stored in a memory of the mobile computing device 110, or may be stored remotely such as on a server or other device. The processor 220 may determine the type of visual content contained within the media file. The processor 220 may determine a resolution, such as an image height and an image width of visual content to be displayed. The processor 220 may determine other aspects of the media file, such as a duration, for example. In the case of a mobile computing device with a graphics device 280, the graphics device 280 may perform the steps described above in place of the processor 220. When the media file is stored remotely such as on a server, the processor of the mobile computing device may cause either the media file itself, or the characteristics of the media file to be acquired from the remote device. For example, metadata containing the characteristics of the file could be sent to the mobile computing device 110.

The mobile computing device 110 illustrated in FIGS. 1-2 and the related discussion are intended to provide a brief, general description of a suitable communication and processing environment in which the invention may be implemented. Although not required, the invention will be described, at least in part, in the general context of computer-executable instructions, such as program modules, being executed by the mobile computing device 110, such as a mobile telephone, or a television set-top box. Generally, program modules include routine programs, objects, components, data structures, etc., that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, hand-held devices, multi-processor systems, microprocessor-based or programmable consumer electronics, and the like.

Figure 3:
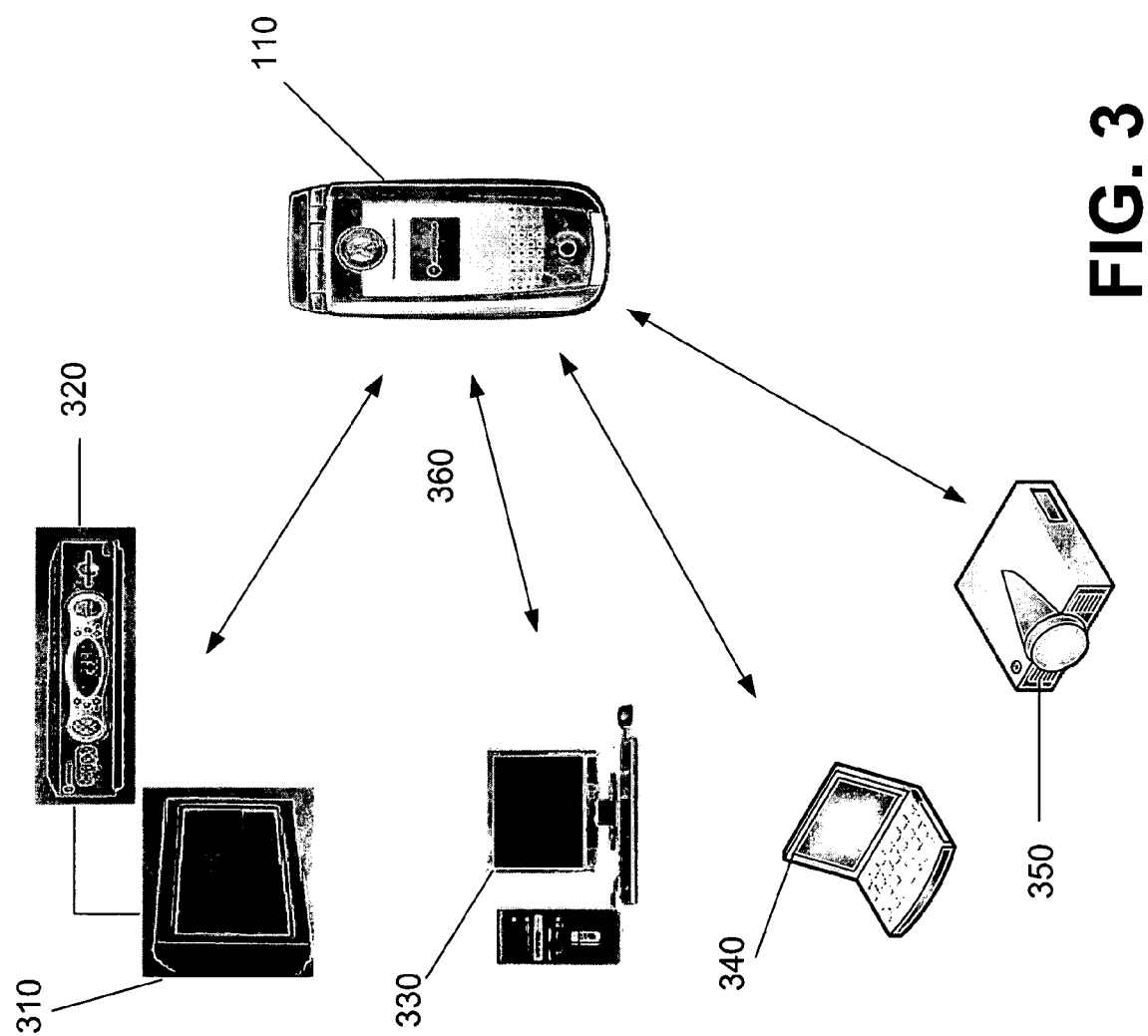
FIG. 3 is an exemplary block diagram of a mobile computing device and connected devices in accordance with embodiments of the invention.

FIG. 3 is an exemplary block diagram of the mobile computing device 110 and connected devices in accordance with a possible embodiment of the invention. In this embodiment, the mobile computing device 110 may be connected to various local computing devices over a network 360. The network may be any type of wireless or wired network, such as a LAN or WAN, a WiFi network, a WIMAX network, an intranet, the Internet, or other network. The mobile computing device 110 may be connected to devices such as a television 310, which may have a connected set top box 320, a desktop computer 330, a laptop computer 340, and a projector 350. Any number of such devices could be connected to the mobile computing device 110. The local computing devices may typically be owned by or controlled by the user of the mobile computing device 110, such as when the local computing devices are in the home of the user or at the user's workplace.

The user of the mobile computing device 110 may want to display a media fie, such as a photo, a video, or other audio or visual file, on one of the local computing devices or the mobile computing device 110. For example, the user may select to display the media file by selecting it using the user interface of the mobile computing device 110. Embodiments of the present invention will create a prioritized list of devices on which to display the media file. The prioritized list is then provided to the user for selection, as further explained below.

The mobile device 110 may communicate with the local devices using any known protocol. However, a particularly useful protocol for use with embodiments of the invention may be UPnP (Universal Plug and Play). UPnP enables networked PCs, networked appliances, and wireless devices to communicate using control and monitoring functions. Its plug and play feature is consumer friendly because it requires minimal or no manual setting. A UPnP device can join any computer network that supports TCP/IP and UDP protocols, announce its presence, convey its capabilities upon request, and learn about the capabilities of other devices on the network. The UPnP protocol allows a search for devices of interest on the network and a retrieval of a description file listing their capabilities, including commands to which the devices will respond.

Embodiments of the invention will cause the mobile computing device 110 to use a protocol such as UPnP to obtain information about the local computing devices, including information such as native resolution of a display, available battery power (when battery operated), set levels of the display such as brightness, contrast, volume, focus and so forth, and control commands that can control these display functions. Then, when the user selects to display a media file, the mobile computing device 110 will create and display a prioritized list of devices capable of displaying the content to the user. The user will be able to select from among the devices from among the devices on the prioritized list.

The prioritized list of devices may be determined by processor 220 based on a program stored in memory 230, for example. The prioritized list may be determined based on different criteria. For example, when the user selects to play a video file, the processor may determine the resolution (or other aspects) of the video file. If the video file has a high resolution such as 1024×768, the order of the prioritized list may be set based on which of the devices connected on network 360 has a display with a correspondingly high resolution. For example, the television 310 and the projector 350 may be higher resolution devices than the other devices in the network, and thus based on this criteria could be placed higher in the prioritized list.

The prioritized list may be determined based on more than one criterion. For example, in addition to resolution of the media file, other criteria may be used such as user preferences of display, available battery power for any of the devices that may be running on battery power, a length of the media file, and so forth. The user may additionally be able to make a selection to always put a particular one of the devices at the top of the prioritized list for a particular type of media file. For example, the user may be able to select to always place the mobile device at the top of the list for photos and to always place the television at the top of the list for high resolution video.

Once the user selects the content file and is presented with the prioritized list, the user may select one of the local devices for displaying or playing of the file. At this point, the user may be presented with further options to set display characteristics on the local device that is selected. For example, if the user selects television 310 for display of the file, the user may be presented with further selections on the display of the mobile computing device 110 to set characteristics of the television such as volume, contrast, color, brightness, and so forth. The user may set these items even when the user is at a different location from the television 310.

Figure 4:
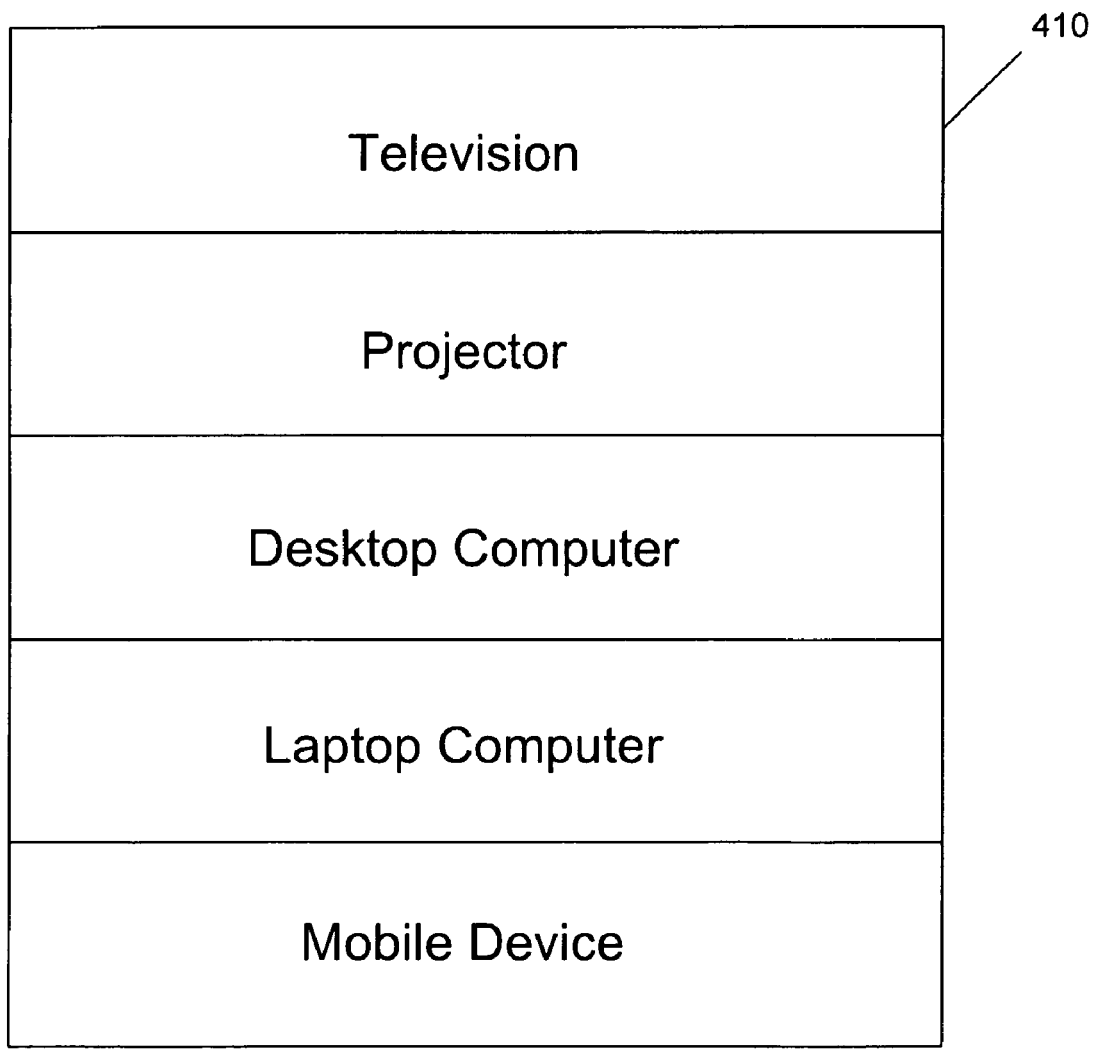
FIG. 4 illustrates a prioritized list of display devices that may be used with embodiments of the invention.

FIG. 4 illustrates a prioritized list 410 that could be presented to the user of the mobile device 110. The prioritized list 410 shows the television at the top of the list, followed by the projector, the desktop computer, the laptop computer, and the mobile device. This particular prioritized list 410 could be presented based on various criteria, such as resolution of the item to be displayed and user preferences, for example.

Figure 5:
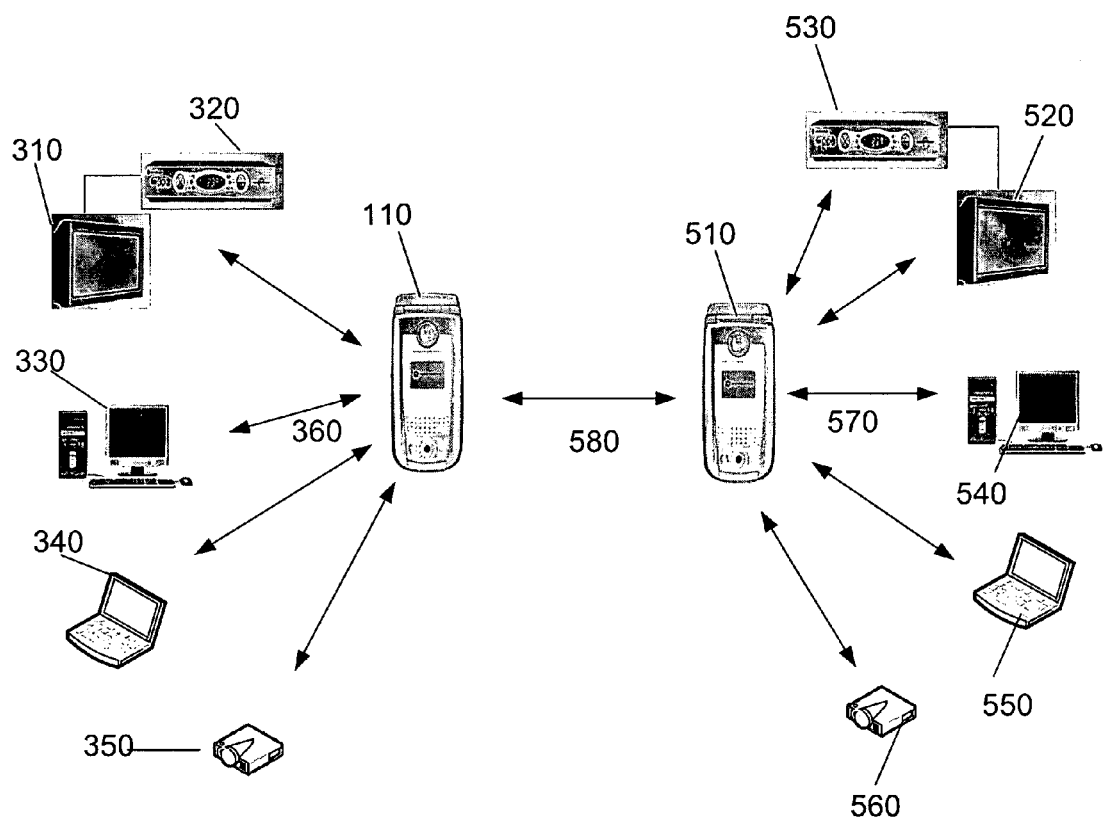
FIG. 5 is an exemplary block diagram of exemplary mobile computing devices and connected devices in accordance with embodiments of the invention.

FIG. 5 illustrates the mobile computing device 110 and its various local connected devices including television 310, desktop computer 330, laptop computer 340, and projector 350, as well as a remote mobile computing device 510 and its associated local connected devices, including television 520, set top box 530, desktop computer 540, laptop computer 550, and projector 560. The mobile computing device 110 and its associated local connected devices are remotely located from the mobile computing device 510 and its associated local computing devices; they can be in different cities.

The mobile computing device 110 and the mobile computing device 510 may connect to each other over any type of network, including a cellular or wireless network, for example. They may also connect over a WiMAX Worldwide Interoperability for Microwave Access) network 580, which is able to convey wireless data over long distances at high data rates. Embodiments of the invention allow the user of mobile computing device 110 to connect to mobile computing device 510. Using a protocol such as UPnP (via compatible UPnP to WAN gateways, see U.S. patent application Ser. No. 11/970,981, filed Jan. 8, 2008, which is incorporated herein by reference), the mobile computing device 110 discovers what local devices are connected to mobile computing device 510 and discovers various characteristics of those devices, such as native resolution, battery power, etc. Further, using UPnP, various control commands are discovered for the devices 520, 540, 550 and 560 allowing control of various functions of the devices such as volume, contrast, brightness, color, and so forth.

With the embodiment of FIG. 5, the user of mobile device 110 is connected to the user's network 360 but may also connect to any number of additional networks, such as network 570. When the user selects a file to play or display, the user may be presented with a choice of which network to display or play the file on, and once the user selects a network, the embodiments will generate the prioritized list of devices for selection by the user. For example, the user of mobile computing device 110 may be connected to local devices over network 360 and be connected to another network 570, which could be for example a network of the user's parents in a distant city. The user could decide to display a file containing high resolution photographs on the television 520 via selection on a menu on the mobile computing device 110.

Using a protocol like UPnP, the mobile computing device 110 discovers the devices in the parents' network 570, presents the prioritized list to the user on the mobile computing device 110, and upon selection of a device by the user, displays the file on the selected device. The user can also set and control various display characteristics of the selected device such as contrast, resolution, volume, brightness, color, etc. from the mobile computing device 110 in the remote city. This is especially useful where the user's parents or other user may not be particularly familiar with the various controls on the television 520 or other devices, allowing the user to control the display characteristics from a remote location.

Figure 6:
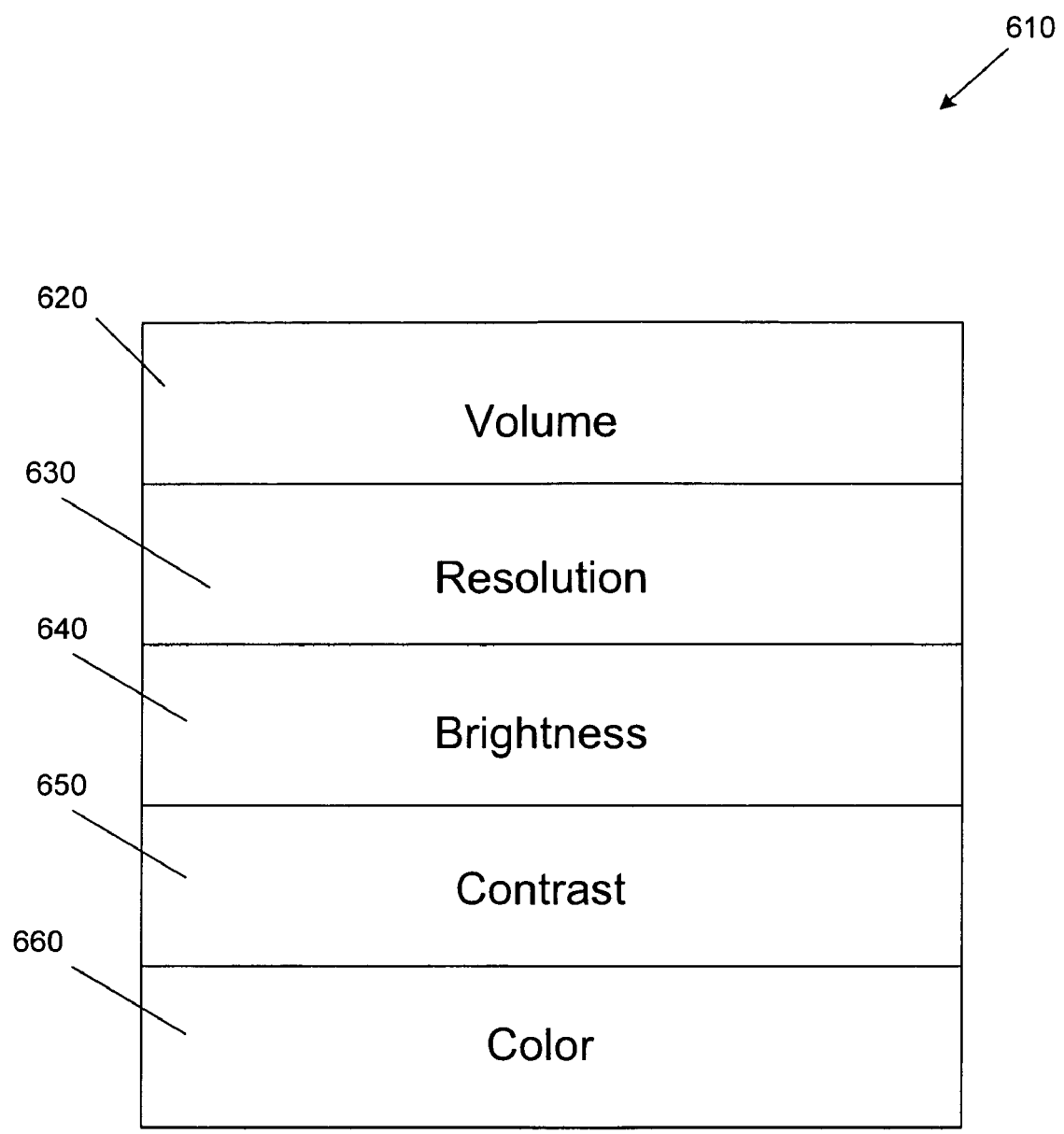
FIG. 6 illustrates a list of display characteristics.

FIG. 6 illustrates a list 610 of display characteristics that could be presented to the user on the mobile computing device 110 after selection of one device for display of a media file. The list 610 includes display characteristics volume 620, resolution 630, brightness 640, contrast 650 and color 660. These are sample display characteristics and any other display characteristics could equally well be used. Upon selection of one of the display characteristics from list 610, embodiments would display an interface allowing adjustment of the selected display characteristic. For example, if a user selected volume 620, a volume adjustment would be displayed allowing the user to set a desired volume. The embodiments allow a user to control the display characteristics of a remotely located device from the mobile computing device 110.

Figure 7:
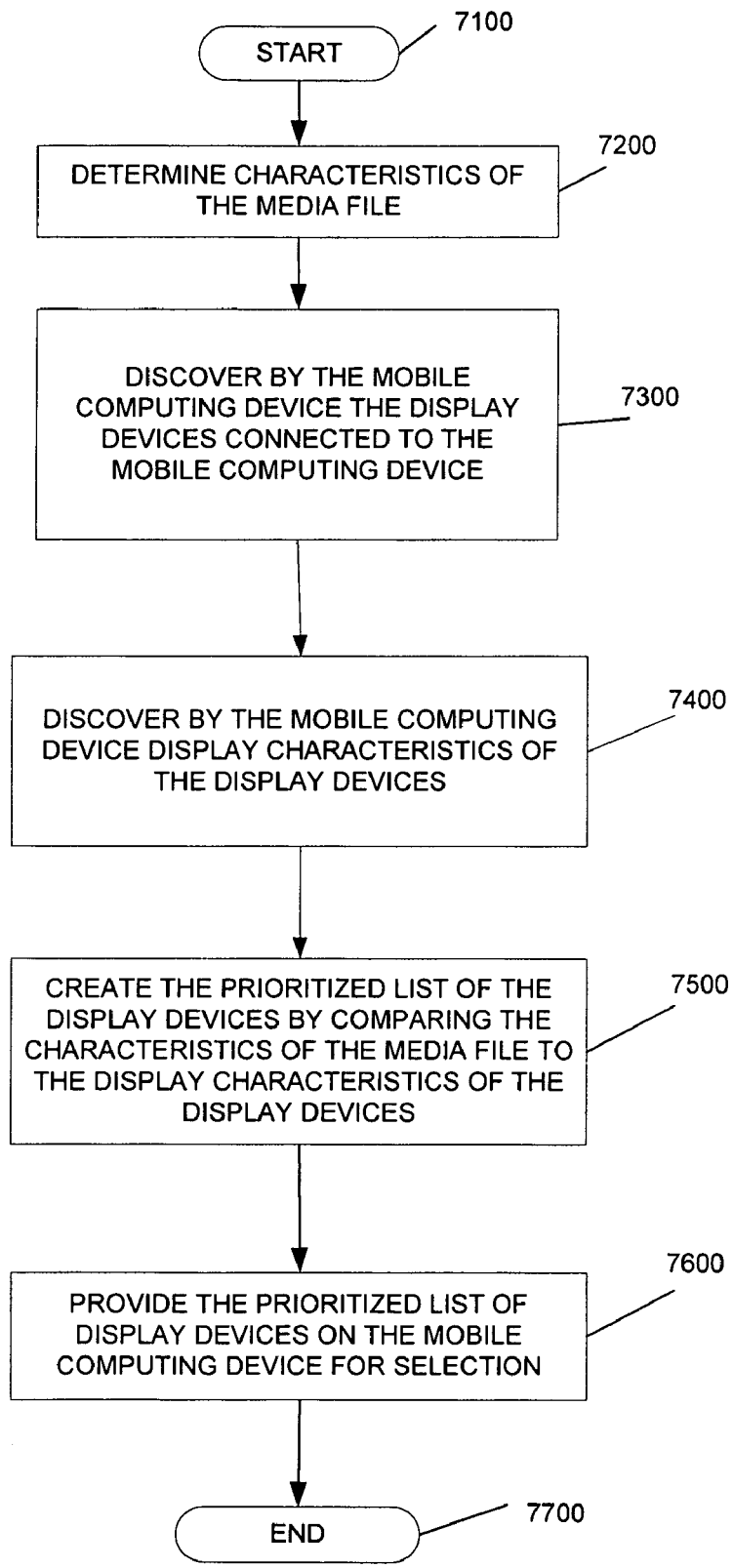
FIG. 7 is an exemplary flowchart illustrating a prioritized list of display devices in a mobile computing device in accordance with embodiments of the invention.

FIG. 7 is an exemplary flow diagram of a method of providing a prioritized list of display devices for display of a media file, the prioritized list being provided on a mobile computing device, the display devices being connected to the mobile computing device in a network in accordance with a possible embodiment of the invention. The process starts at 7100. In this example, at 7200, the characteristics of the media file are determined. Any method of determining the characteristics may be used with the embodiments. One such method involves reading metadata attached to the media file. The metadata may include the media type of the media file. The media file may be stored on the mobile computing device or may be stored remotely, such as on a server or other remote device.

At 7300, the mobile computing device discovers the display devices connected to the mobile computing device. At 7400, the display characteristics of the display devices are discovered. This may be accomplished by use of a protocol having discovery capabilities.

At 7500, the prioritized list of display devices is created by comparing the characteristics of the media file to the display characteristics of the display devices.

At 7600, the prioritized list of display devices is provided on the mobile computing device for selection by a user. At 7700, the process ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. Accordingly, only the appended claims and their legal equivalents should define the invention, rather than any specific examples given.

We claim:

1. A method of providing a prioritized list of display devices for display of a media file, the prioritized list being provided on a mobile computing device, the display devices being connected to the mobile computing device in a network, the method comprising:
    determining characteristics of the media file;
    discovering by the mobile computing device the display devices connected to the mobile computing device;
    discovering by the mobile computing device display characteristics of the display devices;
    creating the prioritized list of the display devices by comparing the characteristics of the media file to the display characteristics of the display devices; and
    providing the prioritized list of the display devices on the mobile computing device for selection by a user;
    wherein the characteristics of the media file are at least one of a resolution of the media file and a duration of the media file;
    wherein the display characteristics of the display devices include at least one of a native resolution and a power availability of each of the display devices;
    wherein creating the prioritized list of the display devices comprises comparing the resolution of the media file to the native resolutions of each of the display devices and arranging display devices higher on the prioritized list that have a native resolution that more closely matches the resolution of the media file; and
    wherein creating the prioritized list of the display devices comprises arranging display devices without sufficient available power to display the media file at the bottom of the prioritized list of the display devices.

2. The method of claim 1 wherein creating the prioritized list of the display devices comprises reviewing past user preferences on displaying a type of the media file and arranging the prioritized list of display devices taking into account the past user preferences.

3. The method of claim 1 further comprising creating a second prioritized list of second display devices for display of a media file, the second prioritized list being provided on the mobile computing device, the second display devices being connected to the mobile computing device in a second network remotely located from the first network.

4. The method of claim 1 further comprising, upon receiving a selection of one of the display devices from the user, presenting at least one of the display characteristics to the user on the mobile computing device for adjustment by the user.

5. The method of claim 1 wherein the mobile computing device is one of a mobile telephone, a cellular telephone, a wireless radio, a portable computer, a laptop computer, an MP3 player, and a satellite radio.

6. A mobile computing device for providing a prioritized list of display devices for display of a media file, the prioritized list being provided on the mobile computing device, the display devices being connected to the mobile computing device in a network, the mobile computing device comprising:
    a memory that stores a plurality of instructions, the instructions being usable for providing the prioritized list of display devices; and
    a processor that executes the instructions to:
        determine characteristics of the media file;
        discover by the mobile computing device the display devices connected to the mobile computing device;
        discover by the mobile computing device display characteristics of the display devices;
        create the prioritized list of the display devices by comparing the characteristics of the media file to the display characteristics of the display devices; and
        provide the prioritized list of the display devices on the mobile computing device for selection by a user;
        wherein the characteristics of the media file are at least one of a resolution of the media file and a duration of the media file; and
    wherein the display characteristics of the display devices include at least one of a native resolution and a power availability of each of the display devices;
    wherein the processor creates the prioritized list of the display devices by comparing the resolution of the media file to the native resolutions of each of the display devices and arranges display devices higher on the prioritized list that have a native resolution that more closely matches the resolution of the media file; and
    wherein the processor creates the prioritized list of the display devices by arranging display devices without sufficient available power to display the media file at the bottom of the prioritized list of the display devices.

7. The mobile computing device of claim 6, wherein the processor creates the prioritized list of the display devices by reviewing past user preferences on displaying a type of the media file and arranging the prioritized list of display devices taking into account the past user preferences.

8. The mobile computing device of claim 6 wherein the processor creates a second prioritized list of second display devices for display of a media file, the second prioritized list being provided on the mobile computing device, the second display devices being connected to the mobile computing device in a second network remotely located from the first network.

9. The mobile computing device of claim wherein the processor, upon receiving a selection of one of the display devices from the user, causes presentation of at least one of the display characteristics of the selected display device to the user on the mobile computing device for adjustment by the user.

10. The mobile computing device of claim 6 wherein the mobile computing device is one of a mobile telephone, a cellular telephone, a wireless radio, a portable computer, a laptop computer, an MP3 player, and a satellite radio.

11. A mobile computing device for providing a first prioritized list of first display devices and a second prioritized list of second display devices for display of a media file, the first prioritized list and the second prioritized list being provided on the mobile computing device, the first display devices being connected to the mobile computing device in a local network, the second display devices being in a remote network, the mobile computing device comprising:
   a memory that stores a plurality of instructions, the instructions being usable for providing the first and second prioritized list of display devices; and
   a processor that executes the instructions to:
      determine characteristics of the media file;
      discover by the mobile computing device the first display devices and the second display devices connected to the mobile computing device;
      discover by the mobile computing device display characteristics of the first and second display devices;
      create the first and the second prioritized lists of the first and the second display devices by comparing the characteristics of the media file to the display characteristics of the first and the second display devices, respectively; and
      provide the first and the second prioritized list of the display devices on the mobile computing device for selection by a user.

12. The mobile computing device of claim 11 wherein the characteristics of the media file are at least one of a resolution of the media file and a duration of the media file and wherein the display characteristics of the first and the second display devices include at least one of a native resolution and a power availability of each of the display devices.

13. The mobile computing device of claim 12 wherein the processor creates the prioritized list of the first and the second display devices by comparing the resolution of the media file to the native resolutions of each of the display devices and arranging display devices higher on the first and the second prioritized lists that have a native resolution that more closely matches the resolution of the media file.

14. The mobile computing device of claim 13 wherein the processor creates the first and the second prioritized lists of the display devices by arranging the display devices without sufficient available power to display the media file at the bottom of the first and the second prioritized lists of the display devices.

15. The mobile computing device of claim 12 wherein the processor creates the first and the second prioritized lists of the display devices by reviewing past user preferences on displaying a type of the media file and arranging the first and the second prioritized lists of display devices taking into account the past user preferences.

16. The mobile computing device of claim 11 wherein the processor, upon receiving a selection of one of the display devices from the user, causes presentation of at least one of the display characteristics of the selected display device to the user on the mobile computing device for adjustment by the user.

17. The mobile computing device of claim 11 wherein the mobile computing device is one of a mobile telephone, a cellular telephone, a wireless radio, a portable computer, a laptop computer, an MP3 player, and a satellite radio.

* * * * *